(12) United States Patent
Tani et al.

(10) Patent No.: US 10,984,826 B2
(45) Date of Patent: Apr. 20, 2021

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hiroshi Tani, Kawasaki Kanagawa (JP); Hiroyuki Suzuki, Kamakura Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/803,339

(22) Filed: Feb. 27, 2020

(65) Prior Publication Data

US 2021/0082461 A1 Mar. 18, 2021

(30) Foreign Application Priority Data

Sep. 18, 2019 (JP) .............................. JP2019-169144

(51) Int. Cl.
*G11B 5/596* (2006.01)
*G11B 5/55* (2006.01)
*G11B 20/18* (2006.01)

(52) U.S. Cl.
CPC .......... *G11B 5/5543* (2013.01); *G11B 5/5539* (2013.01); *G11B 20/18* (2013.01)

(58) Field of Classification Search
CPC ... G11B 5/2652; G11B 5/5543; G11B 5/5539; G11B 5/012; G11B 5/02; G11B 5/265; G11B 5/3945; G11B 5/49; G11B 5/59633; G11B 19/00; G11B 19/01; G11B 19/02; G11B 5/59688
USPC .......................... 360/77.04, 77.07, 77.08, 75
See application file for complete search history.

(56) References Cited

U.S. PATENT DOCUMENTS

| 6,738,215 B2 * | 5/2004 | Yatsu ................. G11B 5/59655 360/75 |
| 6,829,118 B1 | 12/2004 | Takamiya et al. |
| 8,508,880 B2 | 8/2013 | Gao et al. |
| 9,576,597 B2 * | 2/2017 | Trantham ............. G11B 5/5543 |

(Continued)

FOREIGN PATENT DOCUMENTS

| JP | 2001-143218 A | 5/2001 | |
| JP | 2009-93739 A | * 4/2009 | ............... G11B 5/54 |

OTHER PUBLICATIONS

U.S. Appl. No. 16/282,456.

*Primary Examiner* — Nabil Z Hindi
(74) *Attorney, Agent, or Firm* — Kim & Stewart LLP

(57) ABSTRACT

A magnetic disk device includes a magnetic disk, a first read element, a second read element, and a controller. In the magnetic disk, first servo information is written. The controller controls the servo writing of second servo information on the magnetic disk, based on the first servo information. In addition, the controller controls acquisition of the first servo information by the first read element. The controller switches a read element to be used to control the servo writing from the first read element to the second read element based on quality of the first servo information acquired by the first read element.

16 Claims, 15 Drawing Sheets

(56) References Cited

U.S. PATENT DOCUMENTS 10,049,690 B1* 8/2018 Sapozhnikov ....... G11B 5/3169
2003/0099050 A1* 5/2003 Kitagawa ............... G11B 27/24
360/15

* cited by examiner

MAGNETIC DISK DEVICE

CROSS-REFERENCE TO RELATED APPLICATION

This application is based upon and claims the benefit of priority from Japanese Patent Application No. 2019-169144, filed Sep. 18, 2019, the entire contents of which are incorporated herein by reference.

FIELD

Embodiments described herein relate generally to a magnetic disk device.

BACKGROUND

In a step of manufacturing a magnetic disk device, an auxiliary servo pattern serving as a reference for recording a servo pattern is written in advance on a magnetic disk by a servo track writer or the like. For example, after a magnetic disk is assembled to the magnetic disk device, the magnetic disk device writes a servo pattern on the magnetic disk with reference to the auxiliary servo pattern. Such a system in which a magnetic disk device writes a servo pattern on a magnetic disk by itself is known as self servo writing (SSW).

DETAILED DESCRIPTION

Embodiments provide a magnetic disk device capable of writing a servo pattern with high accuracy.

In general, according to one embodiment, the magnetic disk device includes a magnetic disk, a first read element, a second read element, and a controller. In the magnetic disk, first servo information is written. The controller controls servo writing of second servo information on the magnetic disk, based on the first servo information. In addition, the controller controls acquisition of the first servo information by the first read element. The controller switches a read element to be used to control the servo writing from the first read element to the second read element based on quality of the first servo information acquired by the first read element.

Hereinafter, the magnetic disk device according to embodiments will be described in detail with reference to the accompanying drawings. The present disclosure is not limited by these embodiments.

First Embodiment

Figure 1:
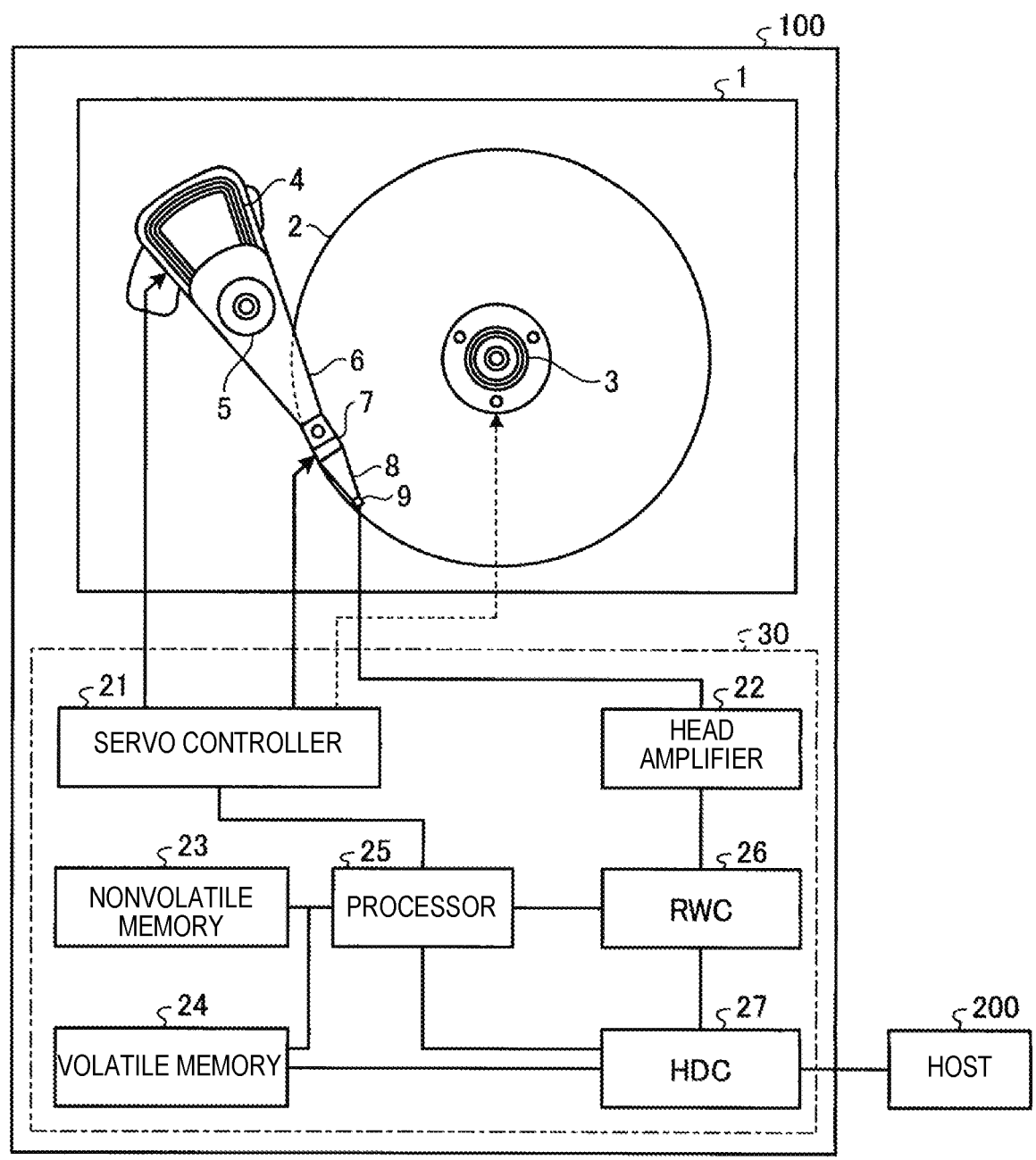
FIG. 1 is a block diagram showing a schematic configuration of a magnetic disk device according to a first embodiment.

FIG. 1 is a block diagram showing a schematic configuration of a magnetic disk device according to a first embodiment.

A magnetic disk device 100 includes a magnetic disk 2. The magnetic disk 2 is an object having a disk shape, and has a magnetic layer formed on a surface thereof. The magnetic disk 2 is supported via a spindle 3. Also, the magnetic disk device 100 is provided with a magnetic head 9 and the magnetic head 9 is disposed to face the magnetic disk 2.

Specifically, a voice coil motor 4 that drives an arm 6 is provided at one end of the arm 6, and a gimbal portion 8 is provided at the other end of the arm 6. The magnetic head 9 is held on the gimbal portion 8. The arm 6 is supported on the magnetic disk 2 via a rotating shaft 5.

The gimbal portion 8 is provided with a microactuator 7 that drives the gimbal portion 8. The voice coil motor (VCM) 4, the arm 6, the gimbal portion 8, and the microactuator 7 form a dual stage actuator using a gimbal microactuator (GMA) system.

The magnetic head 9 is moved relative to the magnetic disk 2 by, for example, a dual stage actuator using a GMA system. The magnetic head 9 is moved to a position corresponding to a target position of the magnetic disk 2, and writes data with respect to the target position or reads data from the target position.

The voice coil motor 4 can coarsely move the arm 6 horizontally with respect to a recording surface of the magnetic disk 2, whereas the microactuator 7 can finely move the gimbal portion 8 horizontally with respect to the recording surface of the magnetic disk 2 by a supplied voltage.

The dual stage actuator is an example of an actuator arm provided with the magnetic head 9 at the tip portion thereof. A configuration of the actuator arm is not limited to the above. The magnetic head 9 may be moved by the voice coil motor 4.

Figure 2:
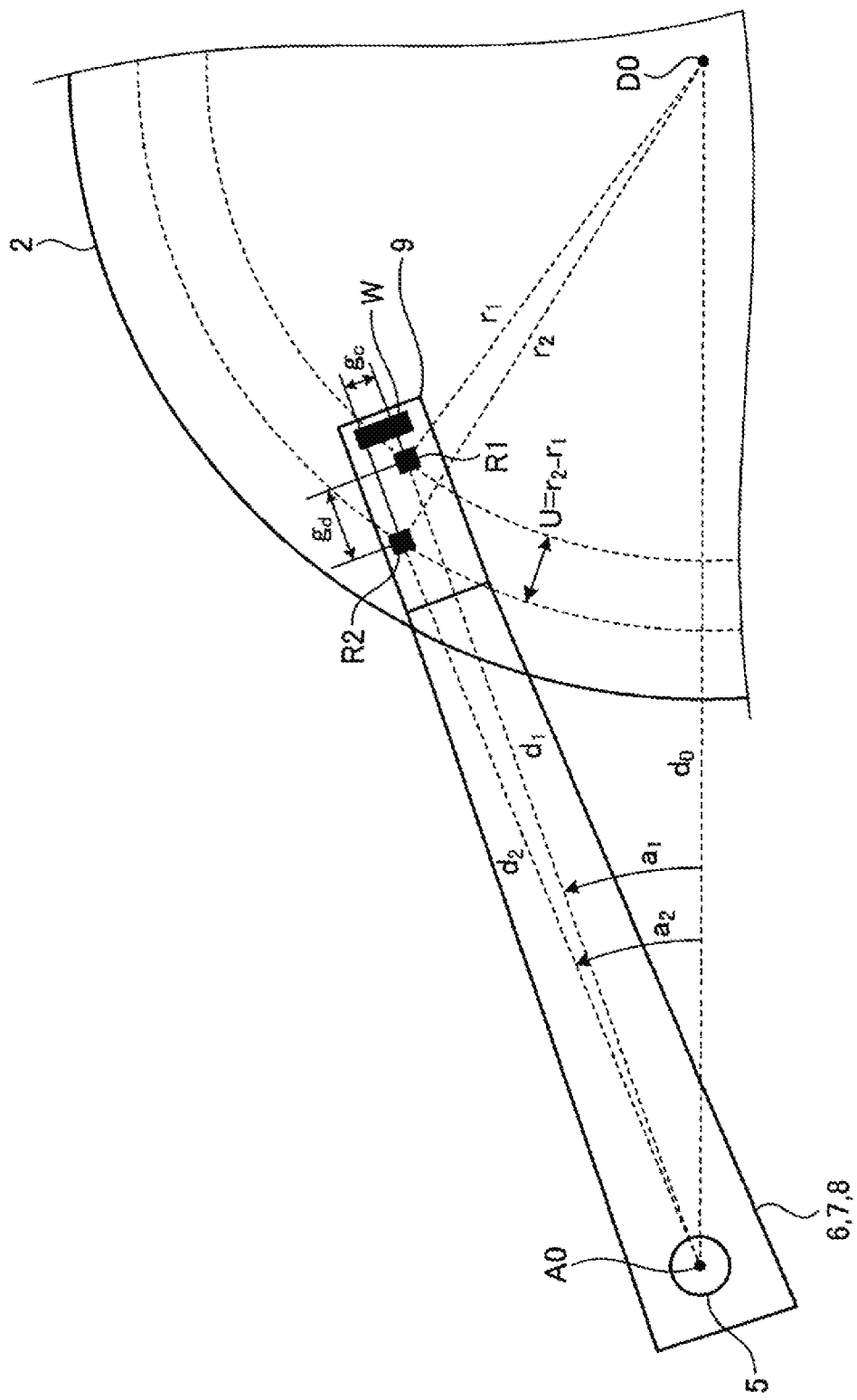
FIG. 2 is a diagram illustrating a configuration of a magnetic head according to the first embodiment.

FIG. 2 is a diagram for illustrating an example of a configuration of the magnetic head 9 according to the first embodiment. The magnetic head 9 includes a write element W and a plurality of read elements R's. In this example, the magnetic head 9 includes a first read element R1 and a second read element R2 as the plurality of read elements R's. The magnetic disk device 100 is configured to be capable of reading data from the magnetic disk 2 by any of the first read element R1 and the second read element R2.

A gap is provided between the first read element R1 and the second read element R2. In other words, the first read element R1 and the second read element R2 are attached to positions separated from each other on the magnetic head 9. Accordingly, it is possible to perform read access to two positions where radial positions on the magnetic disk 2 (that is, a distance from the rotation center of the magnetic disk 2) are different from each other, by each of the first read element R1 and the second read element R2 without changing an angle of the arm 6.

Hereinafter, a relationship between positions accessed by each of the two read elements R's will be described. Here, the rotation center of the arm 6 is noted as A0, and the rotation center of the magnetic disk 2 is noted as D0. Then, various distances and various angles are defined as follows.

d0: Distance between A0 and D0
gc: Gap between read element R1 and read element R2 in a cross track direction
gd: Gap between first read element R1 and second read element R2 in a down track direction
d1: Distance from A0 to first read element R1
d2: Distance from A0 to second read element R2
a1: Angle formed by a straight line connecting A0 and D0 and a straight line connecting A0 and first read element R1
a2: Angle formed by a straight line connecting A0 and D0 and a straight line connecting A0 and second read element R2
r1: Radial position of first read element R1 on magnetic disk 2
r2: Radial position of second read element R2 on magnetic disk 2

According to the definition, the following Equations (1) and (2) are established from the low of cosines.

$$r1^2 = d0^2 + d1^2 - 2*d0*d1*\cos(a1) \quad (1)$$

$$r2^2 = d0^2 + d2^2 - 2*d0*d2*\cos(a2) \quad (2)$$

On the other hand, a gap U between the first read element R1 and the second read element R2 in a radial direction can be represented by the following Equation (3).

$$U = r1 - r2 \quad (3)$$

d0, d1, d2, a2-a1, gc, and gd are constants determined by an arrangement of various components. Therefore, according to the Equations (1) to (3), U may be represented as a function of r1, for example, as shown in the following Equation (4).

$$U = f(r1) \quad (4)$$

As described above, according to the configuration of the magnetic head 9 of the embodiment, it is possible to perform reading from the different radial positions by the first read element R1 and the second read element R2 without moving the arm 6.

In a case where various distances and various angles are defined as above, the following Equation (5) is established.

$$\cos(a2-a1) = (d1-gd)/\mathrm{sqrt}((d1-gd)^2 + gc^2) \quad (5)$$

Referring again to FIG. 1, the magnetic disk 2, the spindle 3, the voice coil motor 4, the rotating shaft 5, the arm 6, the microactuator 7, the gimbal portion 8, and the magnetic head 9 are housed in a case 1. The case 1 and these components housed in the case 1 may be collectively referred to as a head disk assembly.

The magnetic disk device 100 further includes a servo controller 21, a head amplifier 22, a nonvolatile memory 23, a volatile memory 24, a processor 25, a read-write channel (RWC) 26, and a hard disk controller (HDC) 27.

The head amplifier 22 supplies a write signal (current) in accordance with write data input from the RWC 26 to the magnetic head 9. Also, the head amplifier 22 amplifies the read signal output from the magnetic head 9 and supplies the read signal to the RWC 26.

The non-volatile memory 23 is formed by, for example, a nonvolatile memory such as a flash memory. In the non-volatile memory 23, a program executed by the processor 25 is recorded. In addition, in the nonvolatile memory 23, various parameters necessary for normal operation of the magnetic disk device 100 are recorded. The various parameters stored in the nonvolatile memory 23 will be described later.

The volatile memory 24 includes a volatile memory such as a dynamic random access memory (DRAM) or a static random access memory (SRAM). The volatile memory 24 is provided with an area for buffering data to be accessed during the access process from a host 200, an area for storing management information used to control the magnetic disk device 100, and the like.

The RWC 26 is a signal processing circuit. The RWC 26 modulates the write data input from the HDC 27 to output the data to the head amplifier 22. Also, the RWC 26 demodulates a read signal transmitted from the head amplifier 22 to output the signal to the HDC 27.

The HDC 27 is a communication interface that enables communication with the host 200. Specifically, when the HDC receives a write command from the host 200, the HDC 27 stores the write data in the volatile memory 24, and when the write operation is completed, the HDC 27 returns a response to the host 200.

In addition, when the HDC 27 receives a read command from the host 200, the HDC 27 returns the read data stored in the volatile memory 24 to the host 200 by the read operation.

The servo controller 21 supplies current or voltage to a spindle motor that rotates the spindle 3, and rotates the spindle motor at a predetermined speed.

In addition, the servo controller 21 executes control of positioning the voice coil motor 4 and the microactuator in order to move the magnetic head 9 to a position designated by the processor 25.

The processor 25 is, for example, a central processing unit (CPU). The processor 25 executes various processes by a program stored in a nonvolatile storage medium such as the nonvolatile memory 23 and the magnetic disk 2.

For example, the processor 25 executes control processes of writing the write data and reading the read data by the magnetic head 9, a process of determining an access position on the recording surface of the magnetic disk 2, a process of instructing the servo controller 21 of the access position, and the like.

The servo controller 21, the head amplifier 22, the nonvolatile memory 23, the volatile memory 24, the processor 25, the RWC 26, and the HDC 27 form a controller 30 of the embodiment. It should be noted that components of the controller 30 are not limited thereto.

The controller 30 can control self servo writing (SSW). As described above, the SSW is a system in which the magnetic disk device 100 itself writes a servo pattern on the magnetic disk 2. Hereinafter, writing the servo pattern on the magnetic disk 2 is referred to as servo writing.

During the servo writing, a write position of the servo pattern is determined by using an auxiliary servo pattern written in advance on the magnetic disk 2 as a reference.

Figure 3:
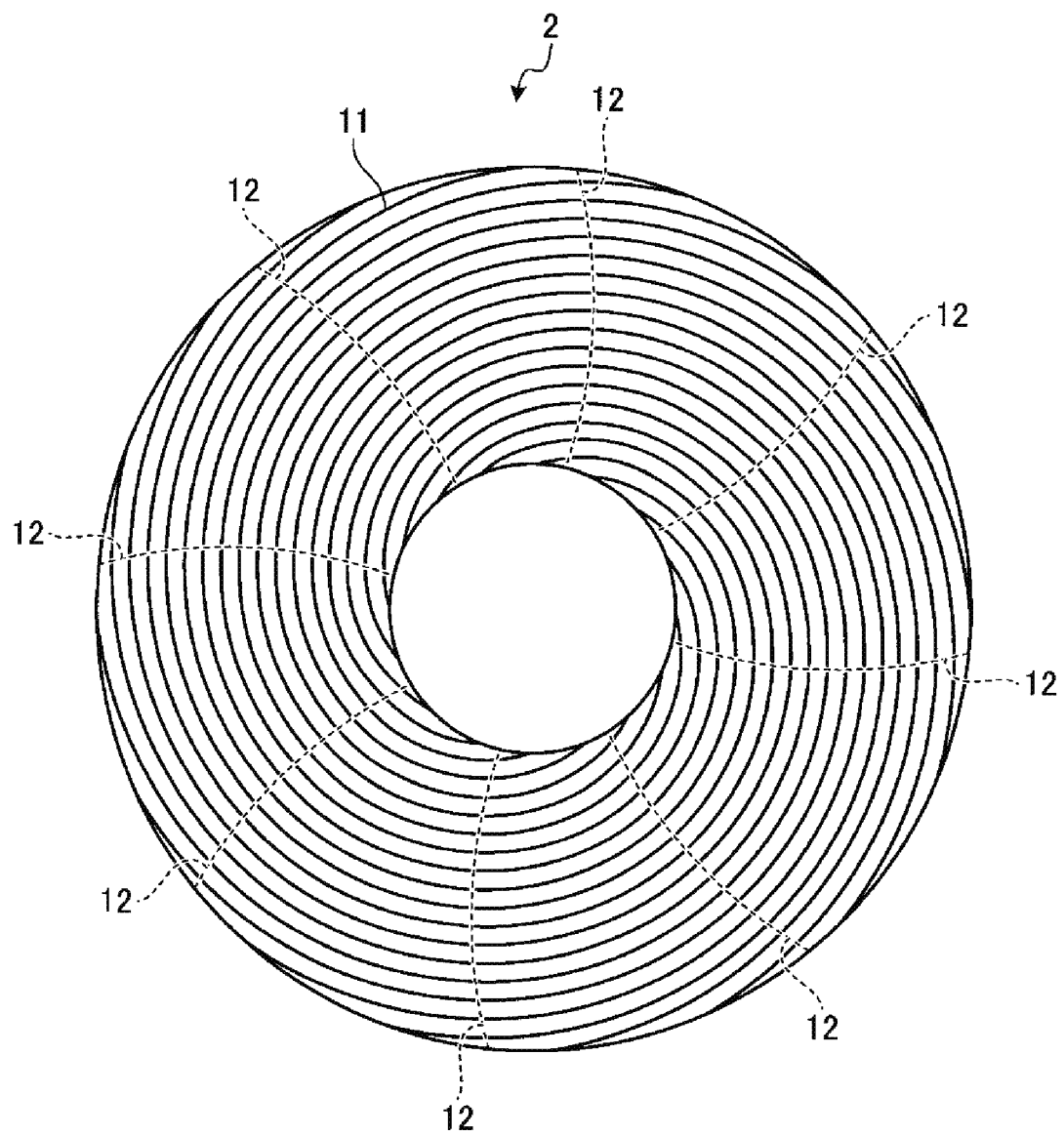
FIG. 3 is a diagram showing a configuration of an auxiliary servo pattern written on a magnetic disk according to the first embodiment.

FIG. 3 is a diagram showing a configuration of the auxiliary servo pattern written on the magnetic disk 2 according to the first embodiment. The auxiliary servo pattern is written in advance on the recording surface of the magnetic disk 2 by a servo track writer or the like. Reference numeral 11 in FIG. 3 represents an example of the auxiliary servo pattern. In this example, the auxiliary servo pattern 11 is a pattern written on the magnetic disk in a spiral shape. Hereinafter, the auxiliary servo pattern 11 is referred to as a spiral pattern. For example, the spiral pattern 11 may be formed by periodically writing a burst pattern and a synchronization pattern at a constant speed from an inner circumference to an outer circumference of the magnetic disk 2. According to the SSW, in the magnetic disk device 100, the spiral pattern 11 is used, thereby determining the write position of a servo pattern 12.

As a technique to be compared to the embodiment (hereinafter referred to as a comparative example), it is considered that a magnetic disk device includes only one read element, and during servo writing, the spiral pattern is read by the read element. According to the comparative example, when the spiral pattern is missing in a position where the spiral pattern is read, or dust or scratches are present in the position, the spiral pattern cannot be read from the position. As a result, the time required for execution of servo writing may increase and quality of the servo pattern may deteriorate.

In the first embodiment, the spiral pattern 11 is read using one read element R out of the first read element R1 and the second read element R2. Then, the one read element used to read the spiral pattern 11 for servo writing is switched, based on the quality of the spiral pattern 11 read by the one read element R.

Figure 4:
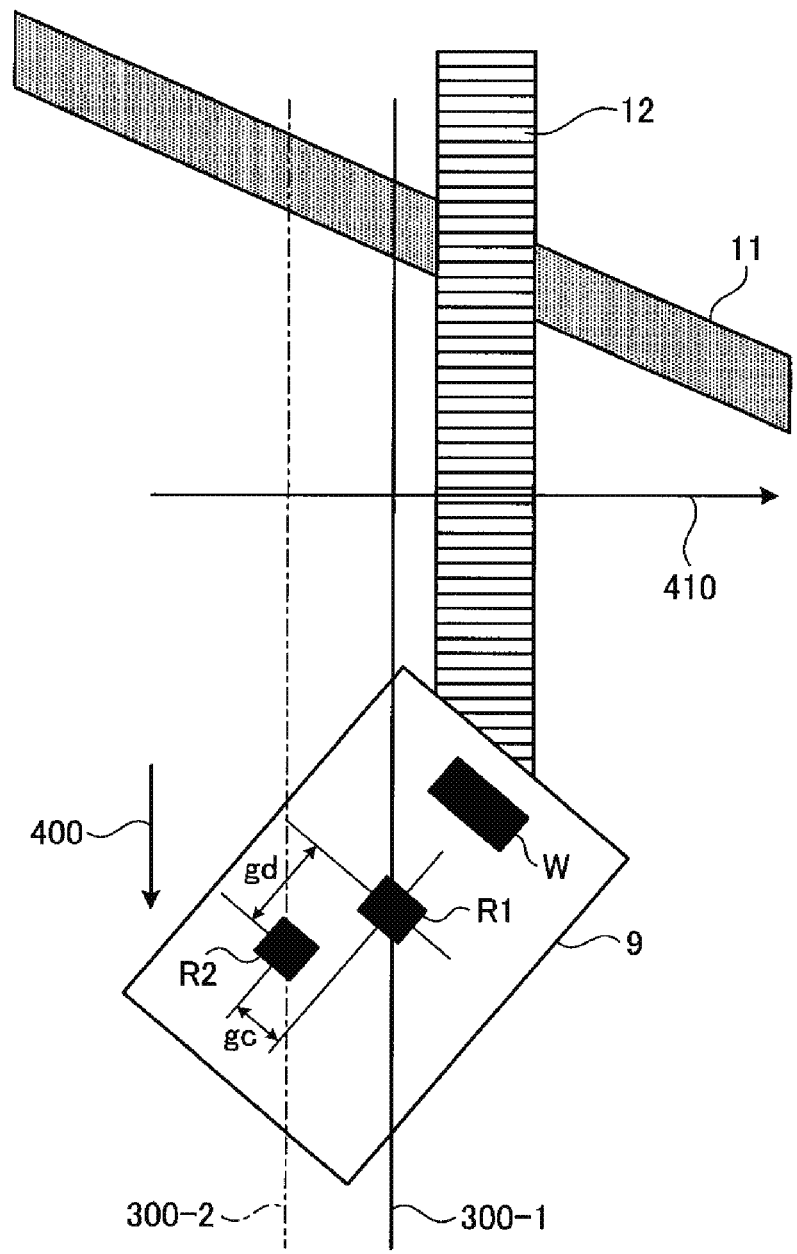
FIG. 4 is a schematic diagram illustrating control of switching of a read element by a controller according to the first embodiment.
Figure 5:
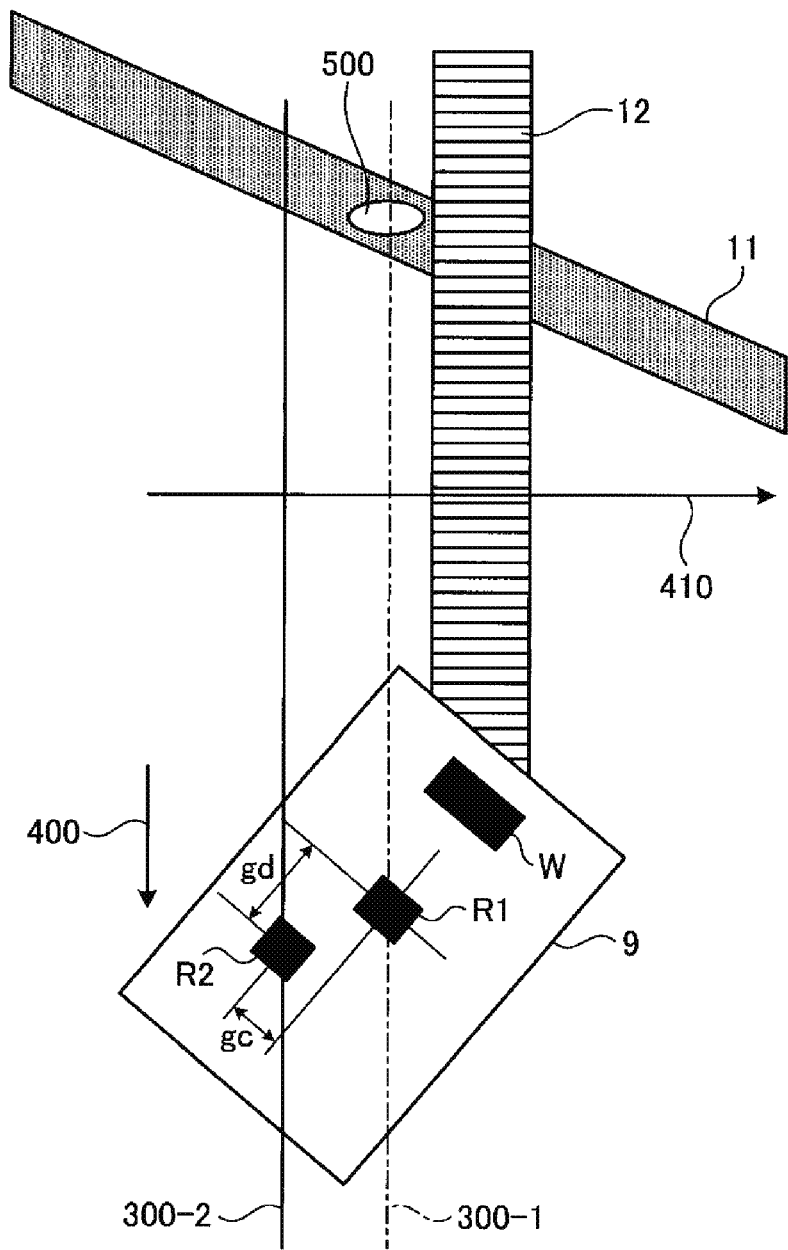
FIG. 5 is a schematic diagram illustrating control of switching of the read element by the controller according to the first embodiment.
Figure 6:
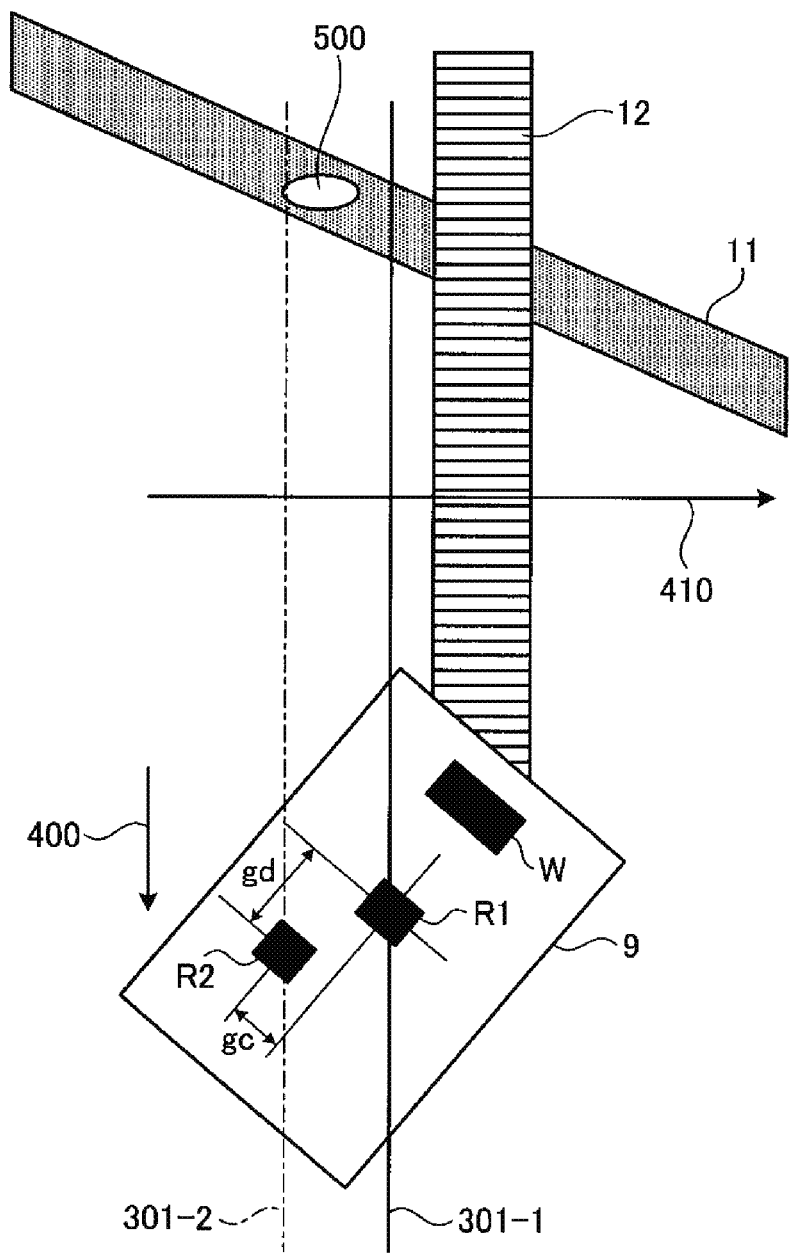
FIG. 6 is a schematic diagram illustrating control of switching of the read element by the controller according to the first embodiment.

FIGS. 4 to 6 are schematic diagrams illustrating a control of switching of the one read element R by the controller 30 according to the first embodiment. The magnetic head 9 is set to be moved relative to the magnetic disk 2 in a direction 400 in FIGS. 4 to 6.

In FIG. 4, the first read element R1 has a first trajectory 300-1 and the second read element R2 has a second trajectory 300-2. The first read element R1 can read the spiral pattern 11 from a position where the first trajectory 300-1 and the spiral pattern 11 cross. The read signal of the spiral pattern 11 read from the position by the first read element R1 is demodulated into a positioning signal. Then, control of the write position of the servo pattern 12 by the write element W is executed based on the positioning signal.

In an example shown in FIG. 5, a missing portion 500 of the spiral pattern 11 is present at a position where the first read element R1 and the spiral pattern 11 cross. In such a case, a positioning signal that normally functions as a reference for determining the write position of the servo pattern 12 cannot be obtained from the position. That is, an error in acquisition of a positioning signal occurs. When the error in acquisition of the positioning signal occurs, the read element R used to control the servo writing, that is, the read element R used to acquire the positioning signal used as a reference of the write position in the servo pattern is switched from the first read element R1 to the second read element R2.

Between the second trajectory 300-2 of the second read element R2 and the first trajectory 300-1 of the first read element R1, there is a gap U as described above. Accordingly, switching the read element R is executed without changing the angle of the arm 6, whereby according to the second read element R2, reading the spiral pattern 11 from the position different from the first read element R1 can be executed.

Referring still to FIG. 5, a position where the second trajectory 300-2 of the second read element R2 and the spiral pattern 11 cross is separated from the missing portion 500. Therefore, according to the second read element R2, it is possible to acquire a positioning signal. Control of servo writing is continued based on the positioning signal obtained by the second read element R2.

The servo writing is executed for each track, for example. Specifically, after a part of the servo pattern 12 is written on a certain track, another portion of the servo pattern 12 is written on another track adjacent to the track. The servo writing is executed while sequentially changing a writing target track, whereby the servo pattern 12 extending in a radial direction is formed on the magnetic disk 2 as shown in FIG. 3.

After the writing shown in FIG. 5, the writing target track is switched to a new track adjacent thereto in a direction indicated by 410. As a result, as shown in FIG. 6, a new second trajectory 301-2 of the second read element R2 is set to cross the missing portion 500. According to the second read element R2, since the positioning signal cannot be acquired from the position where the missing portion 500 is present and the second trajectory 301-2 of the second read element R2 and the spiral pattern 11 cross, the read element R to be used to control the servo writing is switched from the second read element R2 to the first read element R1. The first trajectory 301-1 is a new trajectory of the first read element R1, and according to the first trajectory 301-1, the missing portion 500 can be avoided. Accordingly, it is possible to acquire the positioning signal from a position having no missing portion 500.

In FIGS. 4 to 6, in order to simplify the description, it is assumed that the switching of the read element R is executed when at least one missing portion 500 is detected. A trigger for switching the read element R is not limited to this.

For example, in a case where a plurality of the spiral patterns 11 are formed on the magnetic disk 2, each track crosses the spiral patterns 11 at a plurality of locations. If the positioning signals can be acquired from all locations of the plurality of locations, the write position of the servo pattern 12 can be determined with the highest accuracy. That is, the servo writing with the highest accuracy can be executed. In a case where the positioning signal cannot be obtained from some of the plurality of locations, servo writing can be performed based on the positioning signals obtained from the remaining locations of the plurality of locations, although the accuracy of control of write position for the servo pattern 12 decreases.

On the other hand, the switching of the read element R has a predetermined time. Therefore, if switching of the read element R is frequently executed, the time required for the servo writing increases.

In the first embodiment, as an example, the number of times an error occurs in acquisition of the positioning signal is counted for each track. When the number of error occurrences in acquisition of the positioning signal exceeds a predetermined threshold (first threshold), switching of the read element R is executed.

This makes it possible to write a servo pattern with high accuracy without excessively increasing the time required for the servo writing.

The spiral pattern 11 and the positioning signal acquired by reading the spiral pattern 11 are examples of the first servo information. Also, the servo pattern 12 is an example of the second servo information.

Figure 7:
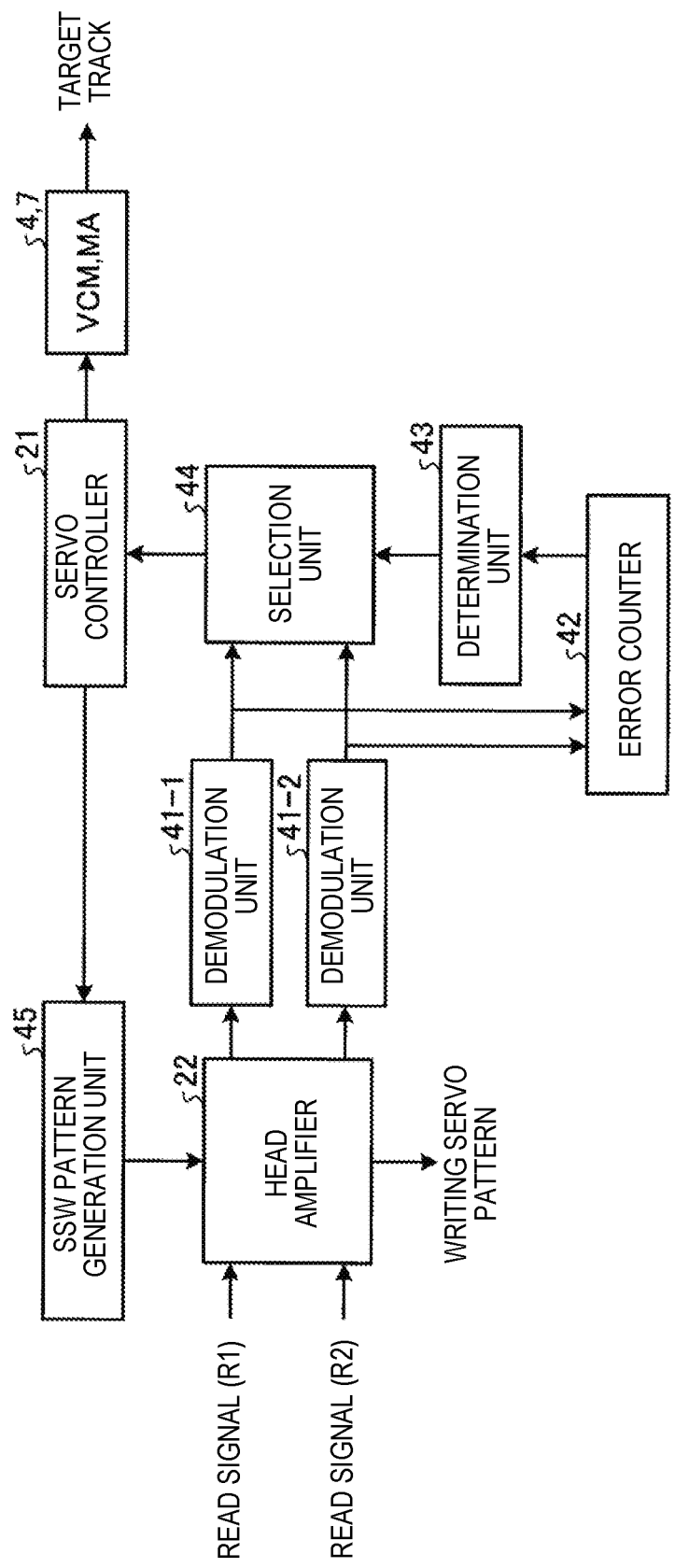
FIG. 7 is a schematic diagram showing a functional configuration of the controller for achieving the switching of the read element according to the first embodiment.

FIG. 7 is a schematic diagram showing an example of a functional configuration of the controller 30 for achieving the switching of the read element R. As shown in FIG. 7, the controller 30 includes a first demodulation unit (demodulator) 41-1, a second demodulation unit 41-2, an error counter 42, and a determination unit (decider) 43, a selection unit (selector) 44, and a SSW pattern generation unit (SSW pattern generator) 45, in addition to the head amplifier 22, the servo controller 21, a VCM 4, and the microactuator 7.

The first demodulation unit 41-1 and the second demodulation unit 41-2 are provided in the RWC 26, for example. The error counter 42, the determination unit 43, the selection unit 44, and the SSW pattern generation unit are implemented by, for example, the processor 25 executing a firmware program. Some or all of the error counter 42, the determination unit 43, the selection unit 44, and the SSW pattern generation unit 45 may be in the HDC 27. Further, some or all of the error counter 42, the determination unit 43, the selection unit 44, and the SSW pattern generation unit 45 may be implemented by a hardware circuit.

The first demodulation unit 41-1 demodulates the read signal obtained by the first read element R1. The second demodulation unit 41-2 demodulates the read signal obtained by the second read element R2.

The error counter 42 detects an error in acquisition of the positioning signal based on the read signal, which is read from the spiral pattern 11 and then demodulated. Then, the error counter 42 counts the number of error occurrences in acquisition of the positioning signal. Here, the error counter 42 counts the number of error occurrences in acquisition for each read element R.

A method of detecting an error in acquisition of the positioning signal is not limited to a specific method. For example, a waveform of the read signal is compared to a predetermined waveform. A normal positioning signal includes a specific waveform called a Sync demodulated signal. When the Sync demodulated signal cannot be acquired from the read signal, it is determined that an error in acquisition of the positioning signal occurred. Alternatively, when the waveform of the read signal is substantially far from a shape of a sine wave or when a signal having a substantially sine wave shape cannot be acquired due to a noise, it is determined that an error in acquisition of the positioning signal occurred.

The positioning signal obtained by demodulating the read signal output from the first read element R1 is denoted as a first positioning signal #1. Also, the positioning signal obtained by demodulating the read signal output from the second read element R2 is denoted as a second positioning signal #2.

The determination unit 43 and the selection unit 44 cooperate with each other to execute switching of the read element R.

Specifically, the determination unit 43 supplies a selection signal that designates a positioning signal to be used to control the servo writing, out of the first positioning signal #1 and the second positioning signal #2, based on the number of error occurrences in acquisition, counted for each read element R to the selection unit 44.

The first positioning signal #1 and the second positioning signal #2 are input to the selection unit 44. The selection unit 44 inputs the positioning signal designated by the selection signal among the input positioning signals to the servo controller 21.

The determination unit 43 and the selection unit 44 switch the positioning signal input to the servo controller 21, thereby achieving the switching of the read element R to be used to control the servo writing.

The servo controller 21 drives the VCM 4 and the microactuator 7 based on the positioning signal input from the selection unit 44, thereby positioning the magnetic head 9 on a target track. The servo controller 21 instructs the SSW pattern generation unit 45 to generate the servo pattern 12 at the timing when the write element W reaches the target position for writing the servo pattern 12.

According to the instruction of the servo controller 21, the SSW pattern generation unit 45 generates the servo pattern 12 and supplies the generated servo pattern 12 to the head amplifier 22. The head amplifier 22 supplies the servo pattern 12 to the write element W, and the write element W writes the servo pattern 12 on the magnetic disk 2.

Next, an operation of the magnetic disk device 100 of the first embodiment configured as described above will be described.

Figure 8:
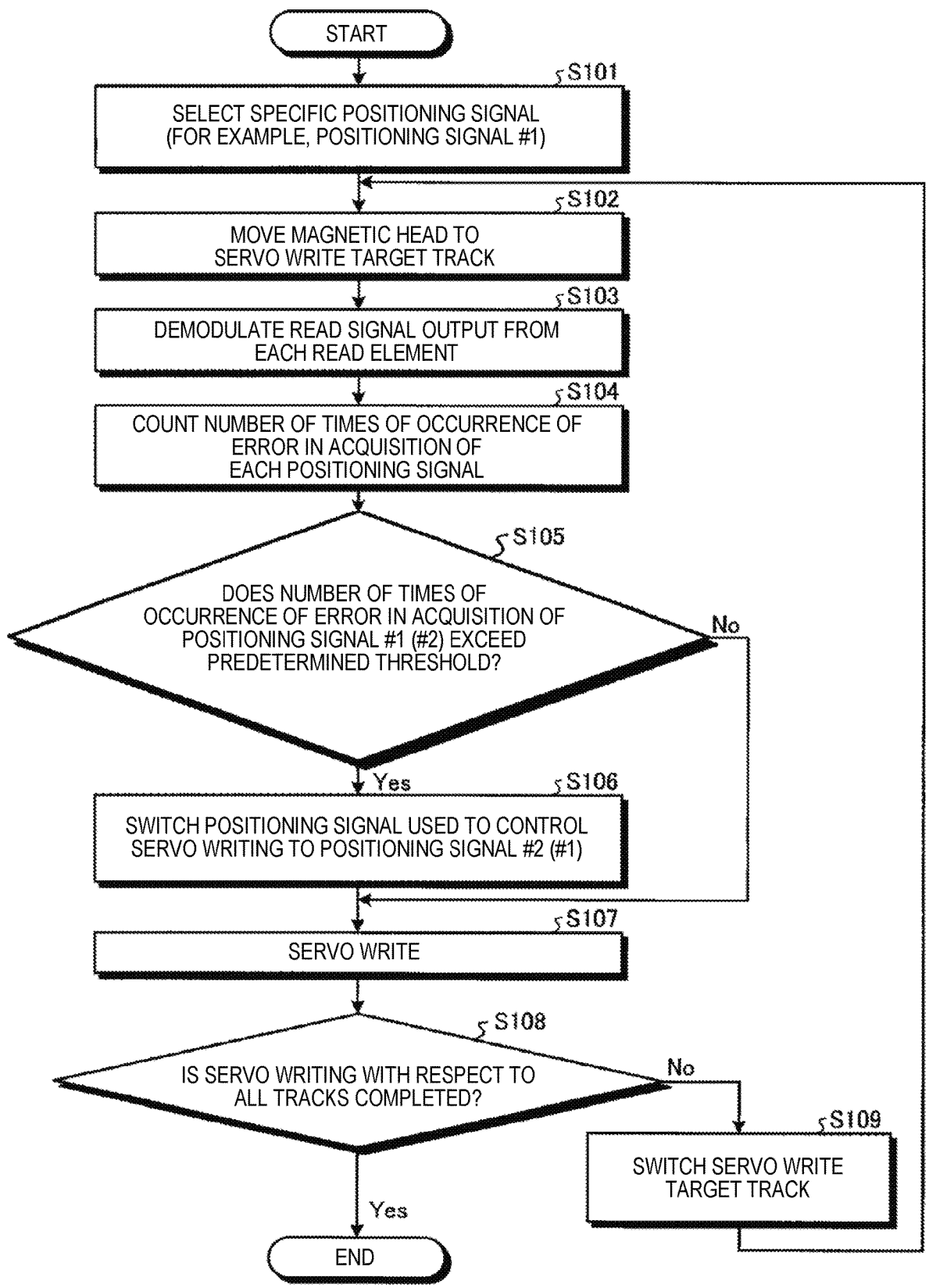
FIG. 8 is a flowchart showing an operation of servo writing by the magnetic disk device according to the first embodiment.

FIG. 8 is a flowchart showing an example of an operation of servo writing by the magnetic disk device 100 of the first embodiment.

First, the determination unit 43 outputs a default value as a selection signal. According to this, a specific positioning signal out of the first positioning signal #1 and the second positioning signal #2 is selected as a positioning signal to be used to control the servo writing (S101).

Any default value of the selection signal may be set. For example, a positioning signal from a preceding read element R on a track out of the first read element R1 and the second read element R2 is designated by the default value of the selection signal. In the example of FIG. 4, the first read element R1 corresponds to the preceding read element R on a track. In an example, the default value of the selection signal designates the first positioning signal #1 obtained by the first read element R1.

Subsequently, the controller 30 moves the magnetic head 9 to a servo writing target track (S102).

Each of the first and second demodulation units 41-1 and 41-2 demodulates the read signal output from each of the first and second read elements R1 and R2, respectively, when the read element R1 and the read element R2 pass the spiral pattern 11 on the track (S103).

The error counter 42 counts the number of error occurrences in acquisition of the first positioning signal #1 and the number of error occurrences in acquisition of the second positioning signal #2, based on each demodulated read signal (S104). The number of error occurrences in acquisition of each positioning signal is counted over the entire circumference of the track.

The determination unit 43 determines whether or not the number of error occurrences in acquisition of the positioning signal (the first positioning signal #1 at a default value) designated by the selection signal exceeds a predetermined threshold (first threshold) (S105).

When the number of error occurrences in acquisition of the positioning signal designated by the selection signal exceeds the threshold (S105: Yes), the determination unit 43 switches the positioning signal to be used to control the servo writing (S106). That is, when the first positioning signal #1 has been designated as a positioning signal used for servo writing control so far by the selection signal, the selection signal is changed to a value that designates the second positioning signal #2.

When the number of error occurrences in acquisition of the positioning signal designated by the selection signal does not exceed the threshold (S105: No), the positioning signal is not switched.

When it is determined that the number of error occurrences does not exceed the predetermined threshold (S105: No), or after switching the positioning signal used to control the servo writing (S106), the controller 30 controls the servo writing (self servo writing) with respect to the track (S107). In S107, the controller 30 controls the write position of the servo pattern using the positioning signal designated by the selection signal.

Subsequently, the controller 30 determines whether or not the servo writing with respect to all tracks is completed (S108). When one or more tracks to which the servo writing has not been performed yet remain (S108: No), the controller 30 selects one track to which the servo writing has not been performed yet, as a servo writing target track (S109). That is, the controller 30 switches the servo writing target track. After the process of S109, the process of S102 is executed again.

When the servo writing with respect to all tracks is completed (S108: Yes), an operation of servo writing ends.

In the example described above, the controller 30 counted the number of error occurrences in acquisition of both the first positioning signal #1 and the second positioning signal #2. The positioning signal to be counted may not necessarily be both the first positioning signal #1 and the second positioning signal #2.

For example, the controller 30 acquires at least one of the first positioning signal #1 and the second positioning signal #2 (for example, a positioning signal designated by the selection signal) by a corresponding read element R out of the first read element R1 and the second read element R2 to count the number of error occurrences in acquisition. Then, the controller 30 switches the read element R to be used to control the servo writing to the second read element R2 from the first read element R, based on a comparison between the number of error occurrences in acquisition and a threshold. As a result, it is possible to control the switching of the read element R in the same manner as in the case of the number of error occurrences in acquisition is counted for both the first positioning signal #1 and the second positioning signal #2.

In the example described above, the magnetic disk device 100 includes two read elements R1 and R2. The present embodiment and the following embodiments are applicable to a magnetic disk device having three or more read element R's. For example, the controller 30 may switch from one read element R of three or more read elements R's to another read element R, based on the number of error occurrences in acquisition of the positioning signal due to the one read element R.

Also, in the example described above, the controller 30 switched the one read element R to another read element R, based on comparison between the number of error occurrences in acquisition of the positioning signal due to the one read element R and a threshold. For example, the controller 30 may be configured to count the number of error occurrences in acquisition of the positioning signal for each of a plurality of read elements R's, and select a read element R with the smallest number of error occurrences in acquisition of the positioning signal. That is, a condition for switching the read element R is not limited only to the comparison between the number of error occurrences in acquisition of the positioning signal and the threshold. The controller 30 may switch the read element R by any method based on the number of error occurrences in acquisition of the positioning signal.

In addition, as an example of the comparison between the number of error occurrences in acquisition of the positioning signal and the threshold, in the above, it is determined whether the number of error occurrences in acquisition of the positioning signal has exceeded the threshold (S105). According to the determination method, when the number of error occurrences in acquisition of the positioning signal is equal to the threshold, the process of S106 is skipped. Handling the case where the number of error occurrences in acquisition of the positioning signal is equal to the threshold is not limited thereto. For example, when the number of error occurrences in acquisition of the positioning signal is equal to the threshold, the process of S106 may be executed.

In addition, in the example described above, the configuration in which the magnetic disk device 100 includes one magnetic disk 2 has been described. The number of magnetic disks 2 of the magnetic disk device 100 may be two or more. The controller 30 may execute the servo writing with respect to a plurality of magnetic disks 2 at the same time. In this case, the controller 30 may acquire the spiral pattern 11 from one of the plurality of magnetic disks 2 on which servo writing is executed at the same time, and may control the write position of the servo pattern 12 on the plurality of magnetic disks 2 based on the acquired spiral pattern 11. In addition, recording surfaces may be provided on both surfaces of the magnetic disk 2, and the controller 30 may execute the servo writing on both surfaces of the magnetic disk 2 at the same time.

As described above, according to the first embodiment, the controller 30 acquires the positioning signal by using at least one of the first read element R1 and the second read element R2 to count the number of error occurrences in acquisition of the positioning signal. Then, the controller 30 switches the read element R to be used to control the servo writing from the first read element to the second read element different from the first read element, based on the number of error occurrences in an acquisition of the positioning signal.

Accordingly, the number of positioning signals that can be acquired can be increased as compared to the comparative example described above. As a result, the positioning accuracy of the servo pattern write position is improved. That is, it is possible to write the servo pattern with high accuracy.

In the example described above, the controller 30 counts the number of error occurrences in acquisition of the positioning signal for each track, and determines the switching of the read element R for each track. The counting of the number of error occurrences in acquisition of the positioning signal or the determination of the switching of the read element R may be executed for a unit other than the track. For example, the controller 30 may execute the counting of the number of error occurrences in acquisition of the positioning signal and the determination of the switching of the read element R, for each of a plurality of tracks. In addition, the controller 30 may execute the counting of the number of error occurrences in acquisition of the positioning signal and the determination of the switching of the read element R, for each area called a band or a zone.

That is, the magnetic disk 2 includes a plurality of storage areas arranged in a radial direction, and the controller 30 may count the number of error occurrences in acquisition for each of the plurality of storage areas and execute the comparison between the number of error occurrences in acquisition and a threshold, for each of the plurality of storage areas. Each of the plurality of storage areas is, for example, a track, a plurality of tracks, a band, or a zone.

Second Embodiment

The threshold to be compared with the number of error occurrences in acquisition of the positioning signal may be set to be changeable. In a second embodiment, a magnetic disk device in which the positioning signal is set to be changeable will be described. Operations of the magnetic disk device of the second embodiment and the following embodiments are executed by the same functional components as those of the magnetic disk device 100 of the first embodiment. Therefore, description of the functional components of the magnetic disk device of the second embodiment and the following embodiments will not be repeated.

Figure 9:
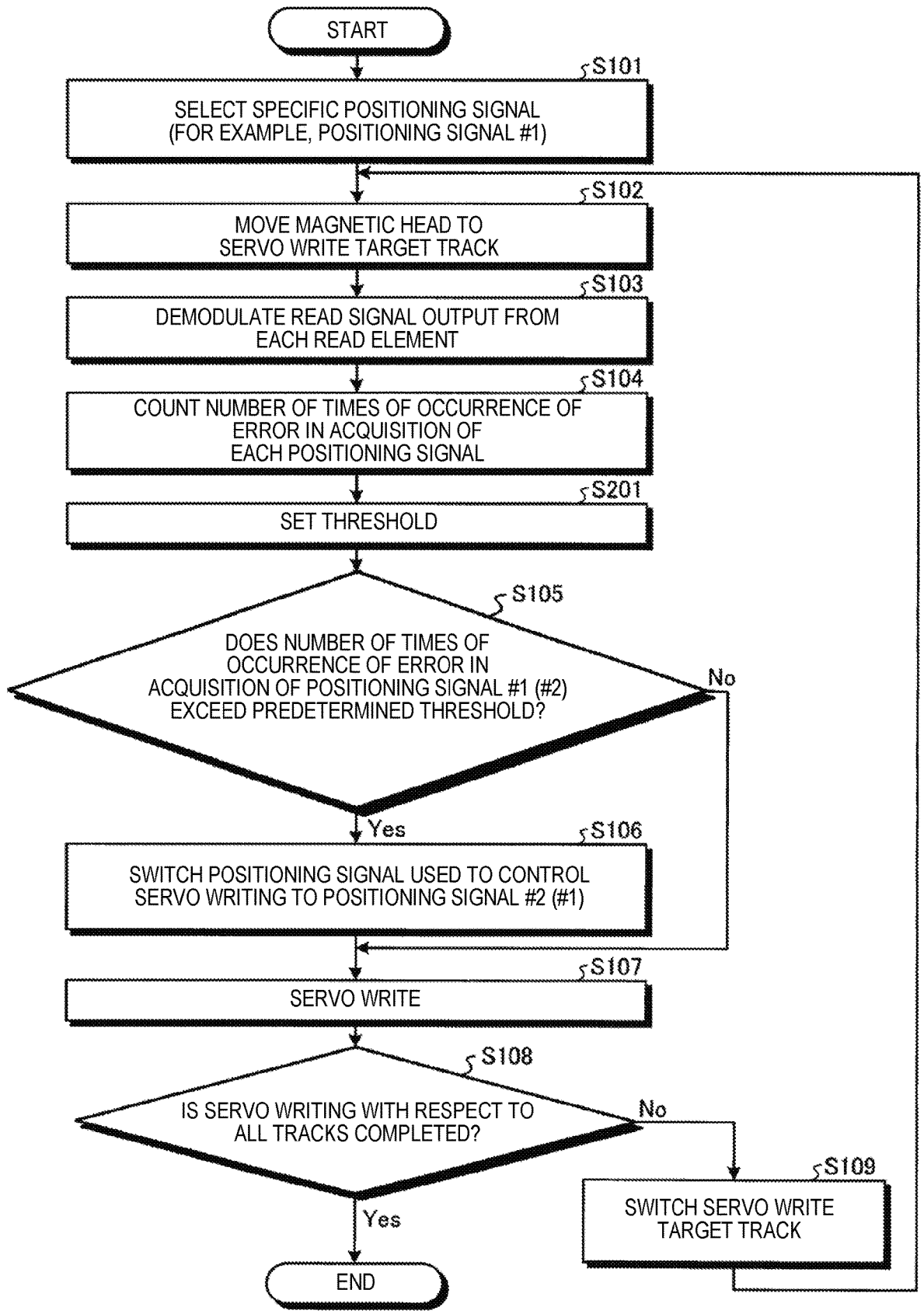
FIG. 9 is a flowchart showing an operation of servo writing by a magnetic disk device according to a second embodiment.

FIG. 9 is a flowchart showing an example of an operation of servo writing by the magnetic disk device 100 of the second embodiment. In the following, the same processes as those executed by the magnetic disk device 100 of the first embodiment are denoted by the same reference numerals as those of the processes executed by the magnetic disk device 100 of the first embodiment, and a detailed description thereof will not be repeated.

First, similarly to the first embodiment, the processes of S101 to S104 are executed. After the number of error occurrences in acquisition of each positioning signal is counted, the determination unit 43 sets a threshold (a first threshold) (S201). The threshold may be set by a command from the host 200, for example. For example, a plurality of candidate values are stored in advance in the nonvolatile memory 23 or the volatile memory 24, and one of the plurality of candidate values is selected as the threshold by a command from the host 200. Alternatively, the magnetic disk device 100 receives numerical information input by a command from the host 200 and sets the numerical information on the determination unit 43 as a threshold.

After S201, the processes of S105 to S109 are executed.

Thus, the controller 30 may be configured to be capable of changing the threshold.

For example, as the threshold becomes smaller, the read element R is switched more frequently. Therefore, as the threshold becomes smaller, the accuracy of control of the write position of the servo pattern 12 is improved, but the time required for servo writing increases. On the other hand, as the threshold becomes larger, the time required for servo writing can be reduced, but the accuracy of control of the write position of the servo pattern 12 deteriorates. For example, operations are possible in a manner that in a case where the accuracy of the control of the write position of the servo pattern 12 is emphasized, the manufacturer sets a large threshold, and in a case where control of time required for production is emphasized, the manufacturer sets a small threshold.

A different threshold may be set according to a radial position in the magnetic disk 2.

For example, at least two storage areas arranged in the radial direction are set on the magnetic disk 2, and the controller 30 makes the threshold different during controlling the servo writing with respect to each of the at least two storage areas. For example, the controller 30 may make the threshold smaller during controlling the servo writing with respect to the storage area on an inner diameter side than during controlling the servo writing with respect to the storage area on the outer diameter side. In addition, the controller 30 may be configured to be able to individually set a threshold with respect to each of at least two storage areas arranged in the radial direction.

In addition, the timing of setting (or changing) the threshold is not limited only to the time after the number of error occurrences in acquisition of each positioning signal is counted. The controller 30 may be configured to be able to set (or change) the threshold at any timing.

Third Embodiment

The magnetic disk device 100 may be configured to count the number of error occurrences in acquisition of each positioning signal, for all tracks at first. In a third embodiment, the magnetic disk device 100 configured to count the number of error occurrences in acquisition of each positioning signal, with respect to all tracks will be described.

Figure 10:
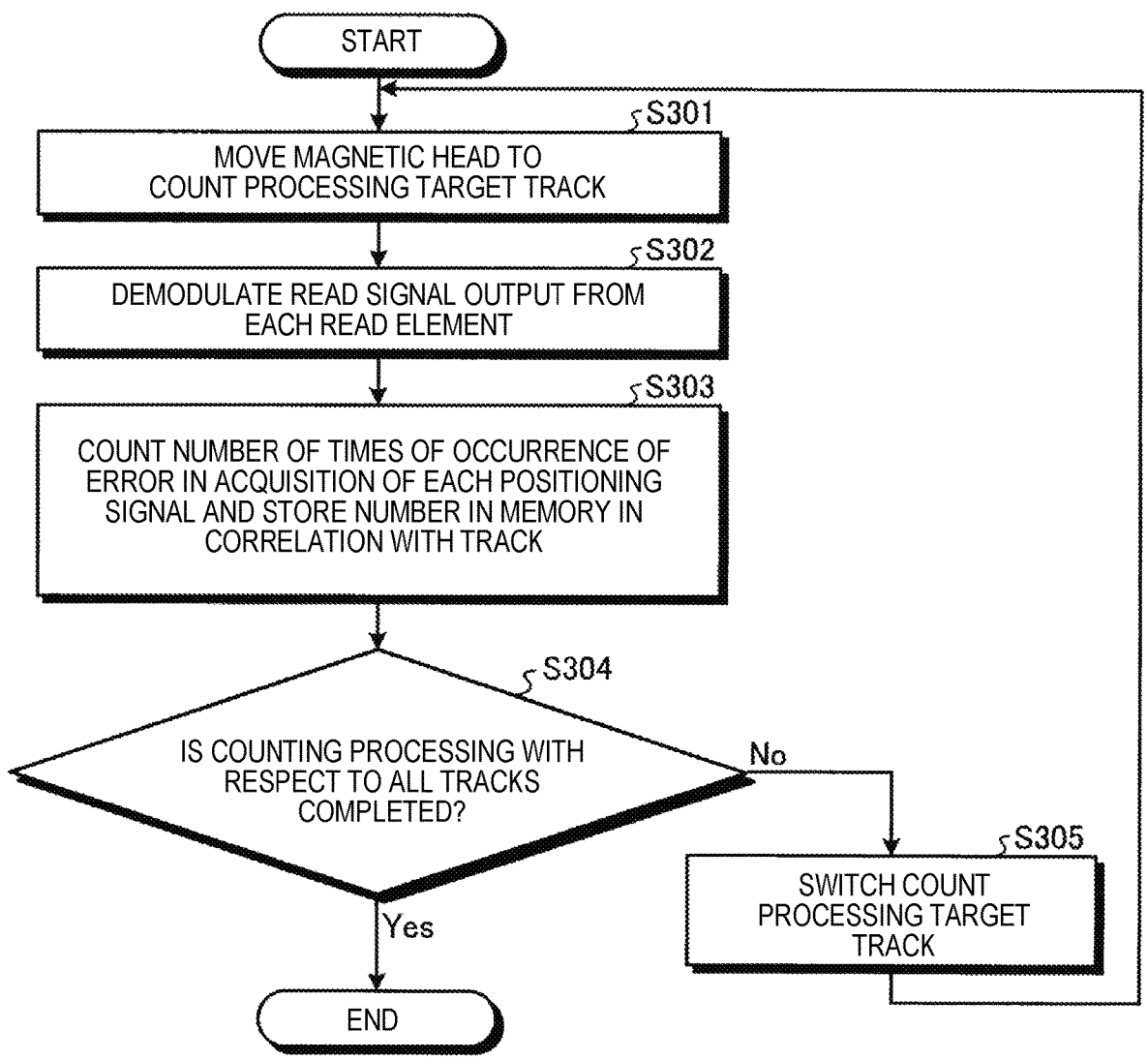
FIG. 10 is a flowchart showing an operation of counting the number of error occurrences in acquisition of each positioning signal by the magnetic disk device according to a third embodiment.

FIG. 10 is a flowchart showing an example of an operation of counting the number of error occurrences in acquisition of each positioning signal by the magnetic disk device 100 of the third embodiment. In the following, the process of counting the number of error occurrences in acquisition of each positioning signal may be referred to as a counting process.

First, the controller 30 moves the magnetic head 9 to a counting process target track (S301).

Subsequently, each of the first and second demodulation units 41-1 and 41-2 demodulates the read signal output from each of the first and second read elements R1 and R2 when passing the spiral pattern 11 on the track (S302). The process of S302 is an example of first acquisition.

The error counter 42 counts the number of error occurrences in acquisition of the first positioning signal #1 and the number of error occurrences in acquisition of the second positioning signal #2, based on each demodulated read signal and stores the number of error occurrences in acquisition of each positioning signal obtained by the counting to a memory (S303). This process corresponds to the counting process. The number of error occurrences in acquisition of each positioning signal is counted over the entire circumference of the track. The memory may be the nonvolatile memory 23 or the volatile memory 24.

Subsequently, the controller 30 determines whether or not the counting process for all tracks (that is, counting of the number of error occurrences in acquisition of each positioning signal) is completed (S304). In addition, when one or more tracks to which the counting process has not been performed yet remain (S304: No), the controller 30 selects one track to which the counting process has not been performed yet, as a next counting process target track (S305). That is, the controller 30 switches the counting process target track. After the process of S305, the process of S301 is executed again.

When the counting process for all tracks is completed (S304: Yes), an operation ends.

Figure 11:
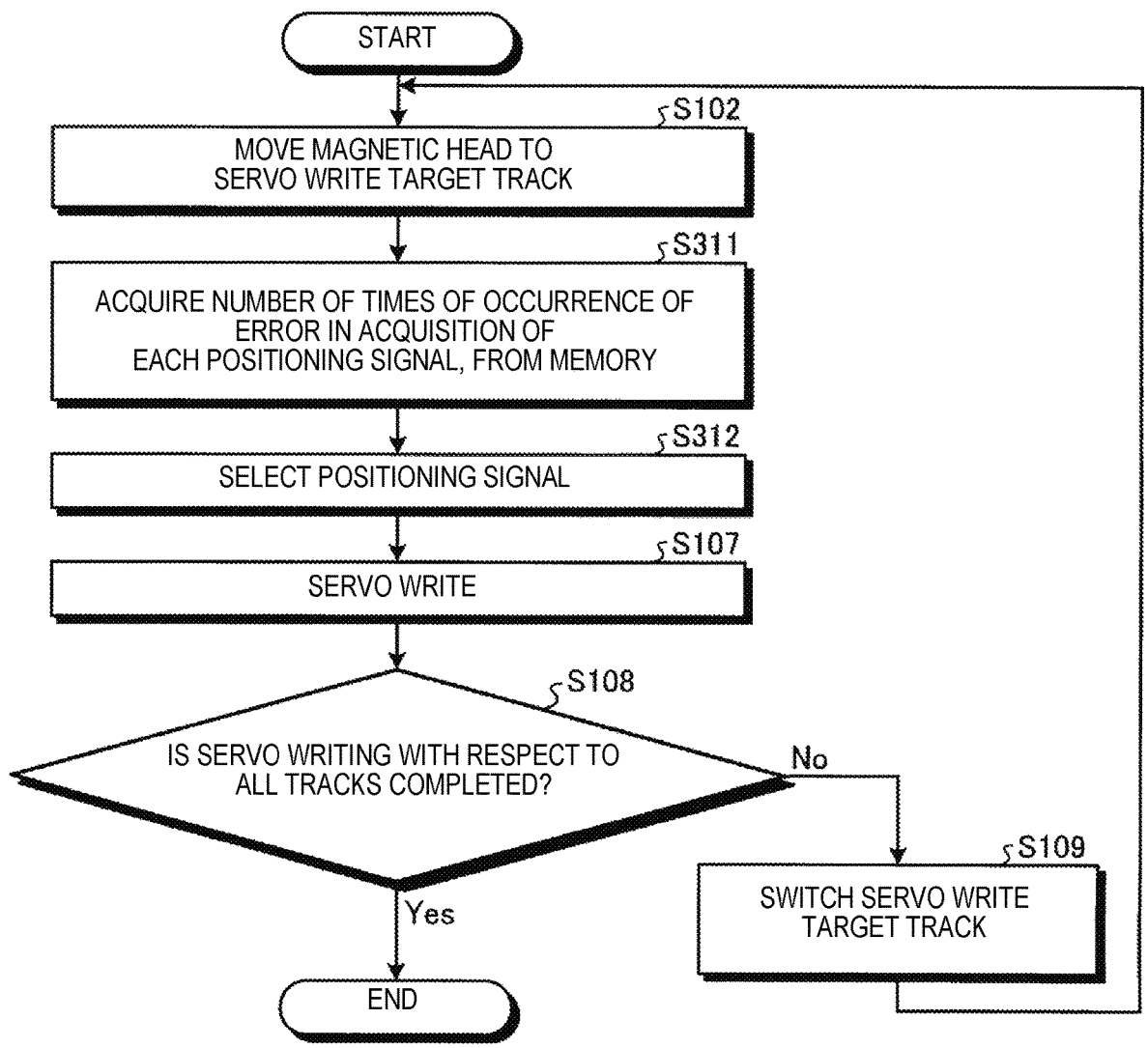
FIG. 11 is a flowchart showing an operation of servo writing by a magnetic disk device according to the third embodiment.

FIG. 11 is a flowchart showing an example of an operation of servo writing by the magnetic disk device 100 of the third embodiment.

First, the controller 30 moves the magnetic head 9 to a servo writing target track (S102). Then, the determination unit 43 acquires the number of error occurrences in acquisition of the first positioning signal #1 and the number of error occurrences in acquisition of the second positioning signal #2, which are counted for the servo writing target track from the memory (S311).

The determination unit 43 selects one of the first positioning signal #1 and the second positioning signal #2 based on the number of error occurrences in acquisition of the acquired positioning signals (S312). For example, the determination unit 43 selects the positioning signal in which the number of error occurrences in acquisition is small. The determination unit 43 inputs a selection signal designating the selected positioning signal to the selection unit 44.

Subsequently, the controller 30 controls the servo writing (self servo writing) with respect to the track (S107). In S107, the controller 30 controls the write position of the servo pattern using the positioning signal designated by the selection signal.

Subsequently, the controller 30 determines whether or not the servo writing with respect to all tracks is completed (S108). In addition, when one or more tracks to which the servo writing has not been performed yet remain (S108: No), the controller 30 selects one track to which the servo writing has not been performed yet, as a servo writing target track (S109), and executes the process of S102 again.

When the servo writing with respect to all tracks is completed (S108: Yes), an operation of servo writing ends.

Thus, according to the third embodiment, the controller 30 executes the acquisition of the positioning signal from all tracks by both the first read element R1 and the second read element R2 to count the number of error occurrences in acquisition of the positioning signal due to the first read element R1 and the number of error occurrences in acquisition of the positioning signal due to the second read element R2. Then, the controller 30 selects one of the first read element R1 and the second read element R2 for each track, based on the number of error occurrences in acquisition of each positioning signal counted for each track. Then, the controller 30 controls servo writing with respect to each track using the selected read element.

That is, as described in the first embodiment, the controller 30 may execute a set including the counting process and the servo writing, for each track. Alternatively, as described in the third embodiment, the controller 30 may execute the counting process with respect to all tracks and then execute servo writing with respect to all tracks. In any of the cases, the controller 30 may select and switch the read element R for each storage area such as a track.

The track is an example of each of the plurality of storage areas arranged in the radial direction. Each of the plurality of storage areas may be, for example, a plurality of tracks, a band, or a zone.

The third embodiment may be used in combination with the second embodiment.

Fourth Embodiment

In the third embodiment, the read element R to be used to control the servo writing is selected for a unit of a track. The read element R to be used to control the servo writing may be selected for a unit of the magnetic disk 2.

In the fourth embodiment, the magnetic disk device 100 executes the counting process by the same operation as in the third embodiment. That is, the magnetic disk device 100 previously acquires the number of error occurrences in acquisition of each positioning signal in the memory through a series of processes shown in FIG. 10.

In the fourth embodiment, the positioning signal is selected based on a cumulative value of the number of error occurrences in acquisition of each positioning signal for all tracks (that is, the entire surface of the storage area of the magnetic disk 2). In the counting process, the controller 30 may store the cumulative value of the number of error occurrences in acquisition of each positioning signal for all tracks in the memory.

The magnetic disk device 100 executes the servo writing after acquiring the number of error occurrences in acquisition of each positioning signal from the entire magnetic disk 2.

Figure 12:
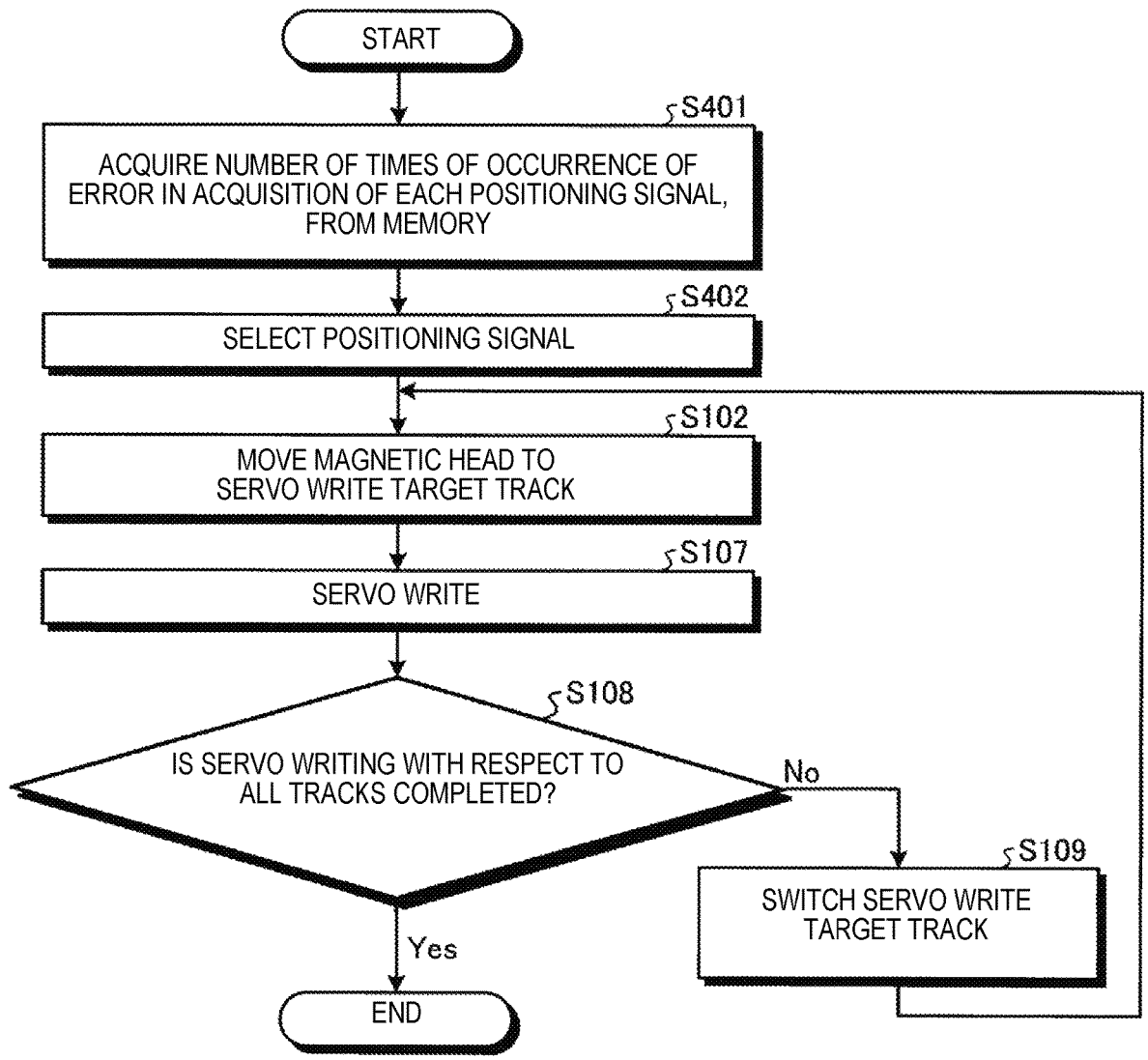
FIG. 12 is a flowchart showing an operation of servo writing by a magnetic disk device according to a fourth embodiment.

FIG. 12 is a flowchart showing an example of an operation of servo writing by the magnetic disk device 100 of the fourth embodiment.

First, the determination unit 43 acquires the number of error occurrences in acquisition of the first positioning signal #1 and the number of error occurrences in acquisition of the second positioning signal #2, which are counted for the all tracks, from the memory (S401). Then, the determination unit 43 selects a positioning signal having a small cumulative value of the number of error occurrences in acquisition of the positioning signal for all tracks, out of the first positioning signal #1 and the second positioning signal #2 (S402).

Figure 13:
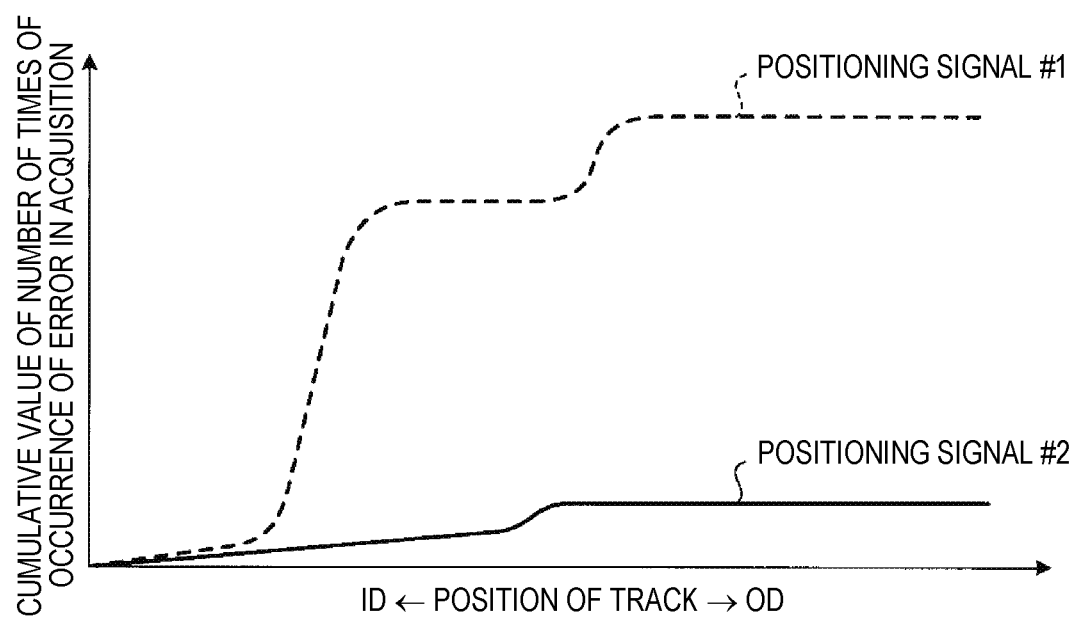
FIG. 13 is a diagram illustrating a cumulative value of the number of error occurrences in acquisition, counted for each positioning signal by the magnetic disk device according to the fourth embodiment.

FIG. 13 is a diagram for illustrating an example of a cumulative value of the number of error occurrences in acquisition, counted for each positioning signal. As an example, the number of error occurrences in acquisition for each track is counted and cumulated in the order from the inner diameter (ID) side track to the outer diameter (OD) side track. According to the example in FIG. 13, the second positioning signal #2 has a smaller cumulative value of the number of error occurrences in acquisition than that of the first positioning signal #1. Thus, for example, the second positioning signal #2 is selected.

Referring again to FIG. 12, the determination unit 43 inputs a selection signal designating the selected positioning signal to the selection unit 44.

After S402, the controller 30 controls the servo writing for all tracks. That is, the controller 30 moves the magnetic head 9 to a servo writing target track (S102). Then, the controller 30 executes the processes of S107 to S109. In S107, the controller 30 controls the write position of the servo pattern using the positioning signal designated by the selection signal.

In this manner, according to the fourth embodiment, the controller 30 executes acquisition of the positioning signal by both the first read element R1 and the second read element R2 from the entire storage area of the magnetic disk 2 to count a number of error occurrences in acquisition of the positioning signal due to the first read element R1 and the number of error occurrences in acquisition of the positioning signal due to the second read element R2. Then, the controller 30 selects one of the first read element R1 and the second read element R2 based on the number of error occurrences in acquisition of each positioning signal. Then, the controller 30 executes control of servo writing with respect to the entire storage area using the selected read element.

That is, the magnetic disk device 100 may select the read element R to execute the servo writing with respect to the entire storage area of the magnetic disk 2 using the selected same read element R, without switching the read element R for each track.

Fifth Embodiment

Figure 14:
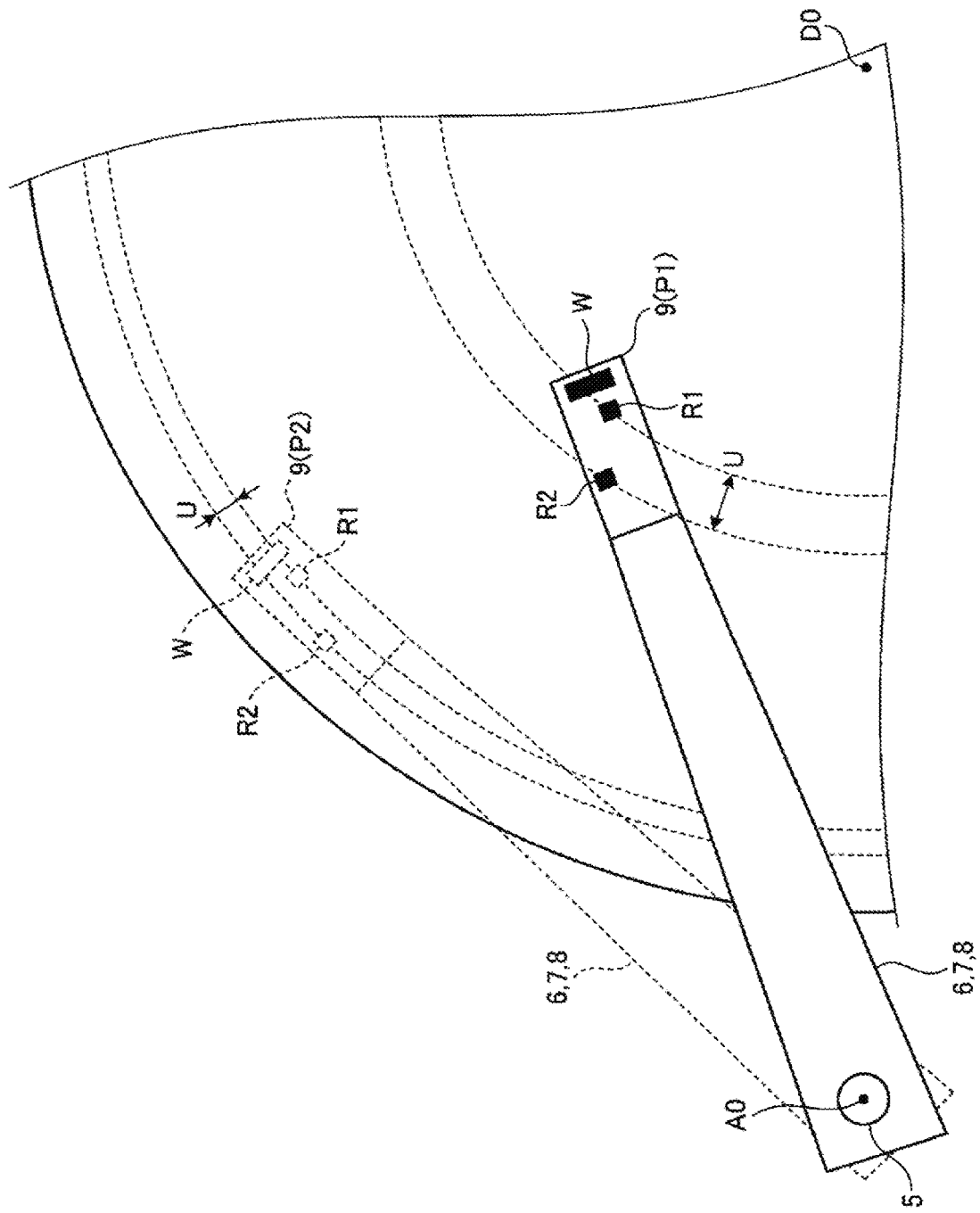
FIG. 14 is a diagram showing two states in which a gap between a first read element and a second read element is different from each other, in a magnetic disk device according to a fifth embodiment.

FIG. 14 is a diagram showing an example of two states in which a gap U between the first read element R1 and the second read element R2 is different from each other, in the magnetic disk device 100 of a fifth embodiment. The gap U is larger when the magnetic head 9 is at a position P1 than when the magnetic head 9 is at a position P2, which means that the gap U between the read element R1 and the read element R2 may be different according to the position of the magnetic head 9.

Figure 15:
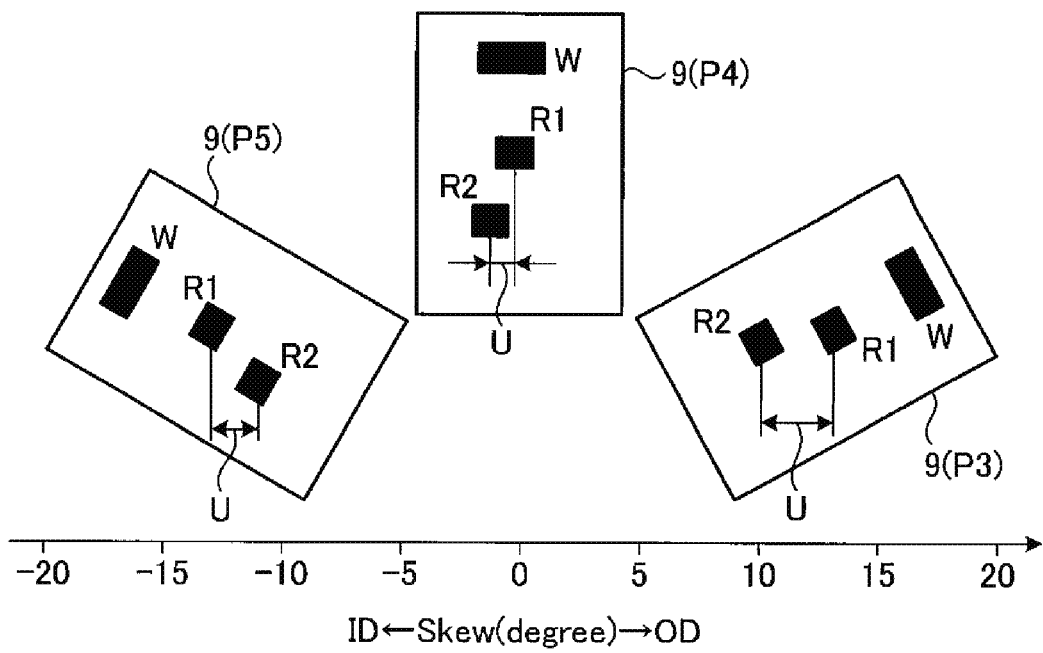
FIG. 15 is a diagram schematically showing a relationship between the gap between the first read element and the second read element and a skew angle of a magnetic head, in the magnetic disk device according to the fifth embodiment.

FIG. 15 is a diagram schematically showing an example of a relationship between the gap U between the first read element R1 and the second read element R2 and a skew angle of the magnetic head 9, in the magnetic disk device 100 of the fifth embodiment. As shown in FIG. 15, when the magnetic head 9 is at a position P3 on the outer diameter side in the magnetic disk 2, the first read element R1 is located on the outer diameter side in the magnetic disk 2. When the magnetic head 9 is at a position P4 where the skew angle is zero, the gap U is smaller than when the magnetic head 9 is at the position P3. When the skew angle is zero, the gap U is equal to gc. When the magnetic head 9 is at a position P5 on the inner diameter side in the magnetic disk 2, the second read element R2 is located on the outer diameter side in the magnetic disk 2. That is, the positional relationship between the first read element R1 and the second read element R2 is reversed.

Figure 16:
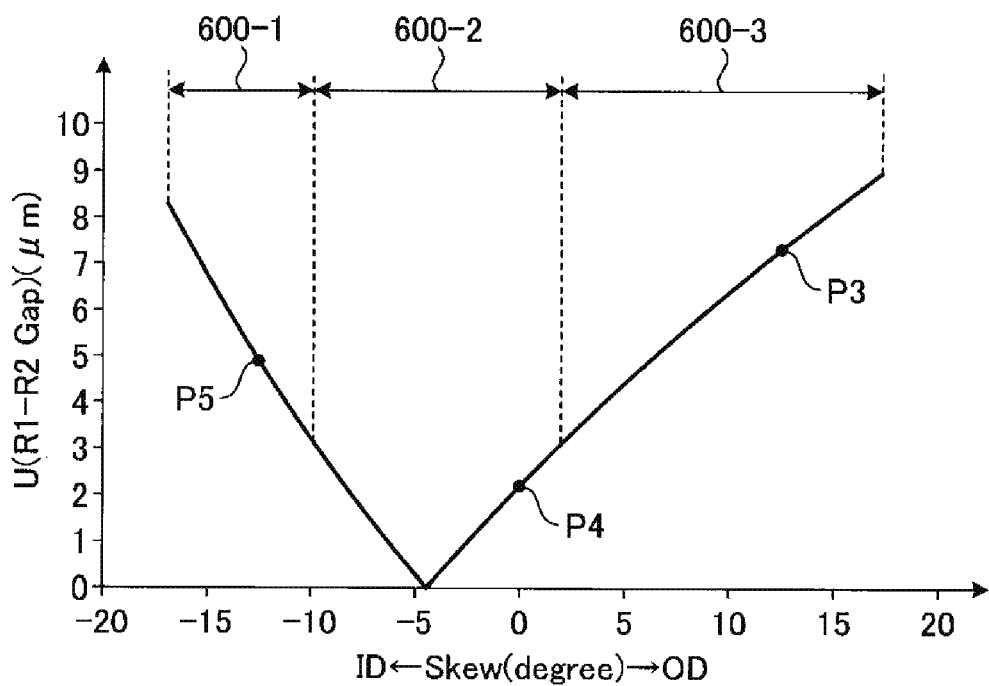
FIG. 16 is a diagram showing details of the relationship between the gap between the first read element and the second read element and the skew angle of the magnetic head in the magnetic disk device according to the fifth embodiment.

FIG. 16 is a diagram showing details of the example of the relationship between the gap U between the first read element R1 and the second read element R2 and the skew angle of the magnetic head 9 in the magnetic disk device 100 of the fifth embodiment. As shown in FIG. 16, the positional relationship between the first read element R1 and the second read element R2 is reversed when the skew angle is approximately −5 degrees. As a result, the gap U becomes zero when the skew angle is approximately −5 degrees. When the skew angle exceeds −5 degrees, the gap U increases according to increase of the skew angle. In addition, when the skew angle is less than −5 degrees, the gap U increases according to a decrease of the skew angle.

For example, when a size of the missing portion 500 is 3 μm, when the gap U is smaller than 3 μm, there is a possibility that the missing portion 500 cannot be avoided by either the first read element R1 or the second read element R2. Accordingly, for example, the controller 30 is configured such that when the gap U is larger than 3 μm, that is, when the skew angle of magnetic head 9 is in a range 600-1 or 600-3 in FIG. 16, switching of the read element R is allowed, and when the gap U is smaller than 3 μm, that is, when the skew angle of the magnetic head 9 is in a range 600-2 in FIG. 16, switching of the read element R is prohibited. Any threshold (second threshold) for the gap U by which it is determined whether or not to prohibit switching of the read element R may be set by design.

As is clear from the examples shown in FIGS. 15 and 16, the skew angle of the magnetic head 9 is related to the position of the magnetic head 9. According to the example shown in FIGS. 15 and 16, when a position where the magnetic head 9 faces the magnetic disk 2 is in a range corresponding to the range 600-1 on the inner diameter side in the magnetic disk 2 or in a range corresponding to the range 600-3 on the outer diameter side in the magnetic disk 2, the switching of the read element R may be allowed. Also, when the position where the magnetic head 9 faces the magnetic disk 2 is in a range between a range corresponding to the range 600-1 on the inner diameter side in the magnetic disk 2 and a range corresponding to the range 600-3 on the outer diameter side in the magnetic disk 2, switching of the read element R may be prohibited.

The fifth embodiment may be used in combination with any of the first to third embodiments.

Sixth Embodiment

In the first to fifth embodiments, the read element R is switched or selected according to the number of error occurrences in acquisition of the positioning signal. The number of error occurrences in acquisition of the positioning signal may be considered as the quality of the positioning signal. That is, the controller 30 may be configured to execute switching or selection of the read element R based on the quality of the positioning signal.

As the quality of the positioning signal to be used to switch or select the read element R, positioning accuracy may be employed instead of the number of error occurrences in acquisition of the positioning signal.

As the number of error occurrences in acquisition of the positioning signal increases, the number of positioning signals to be used for positioning decreases. Accordingly, the positioning accuracy deteriorates. When acquiring the positioning signal for the unit of tracks, the controller 30 estimates a position where a next positioning signal can be acquired, based on the positioning signal that has been already acquired. When the positioning accuracy by the positioning signal that has been already acquired is poor, the estimated position and the position where the next positioning signal is practically acquired are different from each other. The amount of deviation between the two positions increases as the positioning accuracy is poorer.

The controller 30 may execute switching or selection of the read element R based on the deviation amount between the estimated position of the positioning signal and the position where the positioning signal is practically acquired. For example, the controller 30 may switch the read element R when the deviation amount or a cumulative value of the deviation amount exceeds a predetermined value. In addition, the controller 30 may use a read element R having a small deviation amount or a cumulative value of the deviation amount, out of the first read element R1 and the second read element R2, to control the servo writing.

In this manner, the controller 30 may be configured to execute switching of selection of the read element R, based on the quality of the positioning signal. The quality of the positioning signal may be the number of error occurrences in acquisition of the positioning signal, or the deviation amount between the estimated position of the positioning signal and the position where the positioning signal is practically acquired.

The sixth embodiment may be applied to any of the first to fifth embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk on which first servo information is written;
a first read element;
a second read element; and
a controller configured to:
acquire the first servo information using the first read element,
count a number of error occurrences in the acquisition of the first servo information by the first read element,
based on a comparison between the number of error occurrences and a first threshold, switch to the second read element and acquire the first servo information using the second read element, and
control servo writing of second servo information onto the magnetic disk based on either the first servo information as acquired by the first read element or, if the controller switched to the second read element, the first servo information as acquired by the second read element.

2. The magnetic disk device according to claim 1, wherein the magnetic disk includes a plurality of storage areas arranged in a radial direction, and
for each of the plurality of storage areas, the controller is configured to count the number of error occurrences during the acquisition of the first servo information and compare the number of error occurrences to the first threshold.

3. The magnetic disk device according to claim 1, wherein the controller is further configured to change the first threshold.

4. The magnetic disk device according to claim 3, wherein the magnetic disk includes a first storage area and a second storage area arranged in a radial direction, and
the controller changes the first threshold when a storage area on which the servo writing of the second servo information is to be carried out is changed between the first storage area and the second storage area.

5. The magnetic disk device according to claim 1, wherein when a gap between a position of the second read element and a position of the first read element is larger than a second threshold, the controller is allowed to switch to the second read element, and when the gap is smaller than the second threshold, the controller is prohibited from switching to the second read element.

6. The magnetic disk device according to claim 1, further comprising:
an actuator arm that moves relative to the magnetic disk, wherein the first read element and the second read element are attached to positions separated from each other at a tip portion of the actuator arm.

7. The magnetic disk device according to claim 6, wherein the controller is further configured to:
when a skew angle of the tip portion is within a first range of values, switch to the second read element and acquire the first servo information using the second read element, and
when the skew angle is in a second range that is outside of the first range, not switch to the second read element and acquire the first servo information using the first read element.

8. The magnetic disk device according to claim 7, wherein the first range is a range of possible skew angle values at which a gap in a radial direction of the magnetic disk between a first position facing the first read element and a second position facing the second read element is larger than a second threshold, and
the second range is a range of possible skew angle values at which the gap is smaller than the second threshold.

9. The magnetic disk device according to claim 6, wherein the controller is further configured to:
when the tip portion is in a first range of radial positions of the magnetic disk, switch to the second read element and acquire the first servo information using the second read element, and
when the tip portion is in a second range that is outside of the first range of radial positions of the magnetic disk, not switch to the second read element and acquire the first servo information using the first read element, the first range being set on each of an inner diameter side and an outer diameter side of the magnetic disk with respect to the second range.

10. The magnetic disk device according to claim 1, wherein the magnetic disk includes a plurality of storage areas arranged in a radial direction, and
for one of the storage areas, the controller is configured to:
acquire the first servo information using the first and second read elements,
count a first number of error occurrences in the acquisition of the first servo information by the first read element and count a second number of error occurrences in the acquisition of the first servo information by the second read element,
based on a comparison between the first number and the second number, select one of the first read element and the second read element, and
control the servo writing of the second servo information onto said one of the storage areas of the magnetic disk based on the first servo information as acquired by the selected read element.

11. A magnetic disk device comprising:
a magnetic disk having a storage area on which first servo information is written;
a first read element;
a second read element; and
a controller configured to:
acquire the first servo information with respect to an entire storage area of the magnetic disk using the first and second read elements,
select one of the first read element and the second read element based on a quality of the first servo information as acquired by the first read element and a quality of the first servo information as acquired by the second read element, and
control servo writing of second servo information onto the magnetic disk based on the first servo information as acquired by the selected read element with respect to the entire storage area.

12. The magnetic disk device according to claim 11, wherein the controller is further configured to:
count a first number of error occurrences in the acquisition of the first servo information by the first read element and count a second number of error occurrences in the acquisition of the first servo information by the second read element, and select one of the first read element and the second read element based on a comparison between the first number and the second number.

13. The magnetic disk device according to claim 11, further comprising:

an actuator arm that moves relative to the magnetic disk, wherein the first read element and the second read element are attached to positions separated from each other at a tip portion of the actuator arm.

14. A method, comprising:

selecting a first positioning signal from a first read element on a magnetic head of a magnetic disk device or a second positioning signal from a second read element on the magnetic head;

moving the magnetic head to a servo write target track on a magnetic disk of the magnetic disk device;

demodulating a first read signal from the first read element to acquire the first positioning signal and demodulating a second read signal from the second read element to acquire the second positioning signal when the first read element and the second read element cross a first pattern of first servo information;

determining whether a number of error occurrences in acquiring the selected positioning signal exceeds a threshold; and switching the positioning signal used to control servo writing of second servo information in a second servo pattern on the magnetic disk when the number of error occurrences exceeds the threshold.

15. The method according to claim 14, further comprising:

setting the threshold subsequent to acquiring the first positioning signal and the second positioning signal.

16. The method according to claim 14, wherein the first read element and the second read element are attached to positions separated from each other at a tip portion of an actuator arm that moves relative to the magnetic disk, the method further comprising:

switching the read element used to control the servo writing when a skew angle of the tip portion is within a first range of values and not switching the read element used to control the servo writing when the skew angle is within a second range that is outside of the first range, wherein the first range is a range of possible skew angle values at which a gap in a radial direction of the magnetic disk between a first position facing the first read element and a second position facing the second read element is larger than a second threshold, and the second range is a range of possible skew angle values at which the gap is smaller than the second threshold.

* * * * *